428-911 SR

5/27/80 XR 4,205,116

United States Patent [19]

Van Landeghem et al.

[11] 4,205,116

[45] May 27, 1980

[54] FLUORESCENT X-RAY IMAGE INTENSIFYING SCREEN

[75] Inventors: Willy K. Van Landeghem, Sint-Gillis-Waas; André R. Suys, Hove, both of Belgium

[73] Assignee: AGFA-GEVAERT N.V., Mortsel, Belgium

[21] Appl. No.: 897,438

[22] Filed: Apr. 18, 1978

[30] Foreign Application Priority Data

May 6, 1977 [GB] United Kingdom ............... 19118/77

[51] Int. Cl.[2] ........................ G03B 11/00; G21K 3/00; H05G 1/00; G01D 15/14

[52] U.S. Cl. .................................... 428/409; 250/460; 250/482; 250/483; 250/488; 427/65; 427/67; 428/480; 428/518; 428/911; 428/913; 428/917

[58] Field of Search ............... 250/488, 487, 460, 480, 250/482, 483, 485; 427/65, 67; 428/411, 409, 480, 911, 913, 917, 518

[56] References Cited

U.S. PATENT DOCUMENTS

| | | | |
|---|---|---|---|
| 1,846,515 | 2/1932 | Evans | 250/488 |
| 2,694,153 | 11/1954 | Reuter | 250/488 X |
| 2,698,991 | 1/1955 | Mesick | 250/488 X |
| 2,904,689 | 9/1959 | Masi et al. | 250/488 X |
| 2,907,882 | 10/1959 | Patten | 428/481 X |
| 3,164,719 | 1/1965 | Bauer | 428/327 |
| 3,787,238 | 1/1974 | Júliano | 250/488 X |
| 4,073,777 | 2/1978 | O'Neill et al. | 428/480 X |
| 4,090,085 | 5/1978 | Shimiya | 250/487 X |

*Primary Examiner*—Harold Ansher

*Attorney, Agent, or Firm*—A. W. Breiner

[57] ABSTRACT

X-ray image intensifying screen including at least one fluorescent layer comprising phosphor particles dispersed in a binder and on top of such layer a protective layer containing a crosslinked polymer mass obtained by an acid-catalyzed reaction of a polymer or mixture of polymers containing reactive hydrogen atoms and a crosslinking agent, the crosslinking agent being an organic compound containing a plurality of etherified N-methylol groups.

13 Claims, No Drawings

FLUORESCENT X-RAY IMAGE INTENSIFYING SCREEN

The present invention relates to fluorescent X-ray image intensifying screens.

Radiation conversion screens known as X-ray image intensifying screens containing fluorescent substances are employed for absorbing X-rays and converting said rays into light to which silver halide of a photographic material is more sensitive than to direct X-ray exposure. These screens are customarily arranged inside a cassette, so that each side of a silver halide film, emulsion-coated on both sides, after the cassette has been closed, is in intimate contact with an adjacent screen. In exposing the film the X-rays pass through one side of the cassette, through one intensifying (front) screen, through the light-sensitive silver halide film emulsion-coated on both sides and strike the fluorescent substances (phosphor particles) of the second (back) intensifying screen. This causes both screens to fluoresce and to emit fluorescent light into their adjacent silver halide emulsion layer, which is inherently sensitive or spectrally sensitized to the light emitted by the screens.

The commonly used fluorescent screens comprise a support and a layer of fluorescent particles dispersed in a coherent film-forming macromolecular binder medium. Normally a protective coating is applied on top of the fluorescent layer to shield said layer from ambient influences e.g. moisture, air and mechanical abrasion. Without a protective coating, the screen would have a very short life. The protective coatings or protective laminated layers of the prior art vary widely in composition and structure and offer varying degrees of protection toward the action of moisture and abrasion.

Usually these protective coatings are composed of a cellulose derivative coated from a solution in an organic solvent or form a synthetic polymer laminate layer as described, e.g., in the U.S. Pat. No. 3,164,719 of Herbert Bauer, issued Jan. 5, 1965.

Generally, layers comprising cellulosic derivatives are somewhat permeable to moisture; therefore more hydrophobic but also more costly synthetic polymers are used to shield the phosphor layer from moisture, e.g. polymers containing fluorine atoms as described in said U.S. patent specification.

Because of the poor direct adherence of protective coatings applied by lamination, an adhesive is used to more firmly bind such coating to the layer containing the phosphor particles. Adhesives suited for that purpose are described in the already mentioned United States Patent Specification and are composed, e.g., of a polyester and a diisocyanate curing agent therefor.

The protection from moisture is required not only to prevent the fluorescent layer from staining but also to prevent water from adsorbing to the phosphor particles. A broad class of halide-containing phosphors is more or less hygroscopic and even small amounts of water reduce the fluorescent light-emitting power of the phosphor after a certain time so that the intensifying screen becomes useless in the long run.

In accordance with the present invention an X-ray image intensifying screen is provided, which contains an outermost layer with very low water-permeability, insolubility in organic solvents and high abrasion resistance.

The present invention includes further a process for preparing such screen.

The X-ray image intensifying screen of the present invention includes at least one fluorescent layer comprising phosphor particles dispersed in a binder and on top of such layer a protective layer containing a cross-linked polymer mass obtained by an acid-catalyzed reaction of a polymer or mixture of polymers containing reactive hydrogen atoms e.g. forming part of one or more groups of the class consisting of free hydroxyl groups,

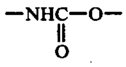 groups, and —COOH groups, and an organic compound containing a plurality of etherified N-methylol groups, preferably

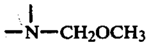 groups as cross-linking agent.

A polymer containing reactive hydrogen atoms forming part of free hydroxyl groups and appropriate for acid-catalyzed crosslinking with compounds containing etherified N-methylol groups is, e.g., a polyester comprising free hydroxyl groups, a polyvinyl acetal in which part of the hydroxyl groups of the polyvinyl alcohol starting product has not been acetalized, a copolymer of vinyl alcohol and vinyl chloride, or a copolymer of vinyl chloride, vinyl acetate and vinyl alcohol.

Preferably used for the purpose of the present invention is a polyvinyl butyral with from 80 to 90% by weight of vinyl butyral units, 7 to 20% by weight of vinyl alcohol units and 0 to 3% by weight of vinyl ester units, e.g. vinyl acetate units. The molecular weight of the polyvinyl butyral may be within a broad range but is preferably between 45,000 and 55,000. Polyvinyl butyrals characterized by an intrinsic viscosity of 0.75 to 1.25 $dl.g^{-1}$ determined in ethanol at 20° C. are particularly useful.

Polymers containing reactive hydrogen atoms forming part of

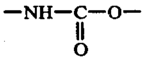 groups and appropriate for acid-catalyzed crosslinking with compounds containing etherified N-methylol groups are polyurethane polymers e.g. as described in U.S. Pat. No. 3,743,833 of Peter A. Martic and John M. McCabe, issued July 3, 1973. An example of a useful polyurethane polymer that is commercially available is sold under the tradename ESTANE 5707 F-1 (ESTANE is a trademark of the B. F. Goodrich Chem. Co. for a polyurethane resin).

Appropriate crosslinking agents containing a plurality of etherified N-methylol groups are derived from reaction products of formaldehyde with urea or with melamine. A particularly useful crosslinking compound for the purpose of the present invention is hexakis(methoxymethyl)-melamine corresponding to the following structural formula:

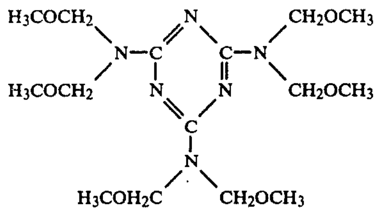

Such compound is commercially available under the trade name CYMEL 300 of American Cyanamid Company, New York, USA.

It is assumed that the acid-catalyzed crosslinking reaction of said compound with a polymer having reactive hydrogen atoms takes place as follows:

$$>N-CH_2OCH_3+H-R \overset{H^+}{\rightleftharpoons} >N-CH_2R+CH_3OH$$

wherein R represents the organic group of the polymer involved.

The reaction proceeds preferably at elevated temperature. A preferred crosslinking temperature also called curing temperature is in the range of 80° to 160° C.

The amount of crosslinking agent with respect to crosslinkable polymer(s) is preferably in the range of 5 to 20% by weight.

In practice it is preferred to use strong acids such as hydrochloric acid, phosphoric acid, monobutyl phosphate, polystyrene sulphonic acid and p-toluene sulphonic acid as catalyst. Preferably p-toluene sulphonic acid is used, which is an acid that is soluble in an organic solvent such as ethanol in which the crosslinkable polymer e.g. the polyvinyl butyral can be dissolved. The amount of acid catalyst with respect to crosslinkable polymer is preferably in the range of 0.2 to 4% by weight.

The thickness in dry state of the protective coating in the present invention is preferably in the range of 2 μm to 20 μm.

The protective coating will generally be an outermost coating. However screens wherein such protective coating is itself overcoated are not excluded from the scope of the invention. Any such overcoating must of course not prevent the protective coating from fulfilling its protective function in respect of the fluorescent layer. It could fulfil some ancillary purpose.

Protective coatings e.g. on the basis of said polyvinyl butyral crosslinked with hexakis(methoxymethyl)-melamine that are perfectly transparent to visible light and ultraviolet radiation are important with respect to the light-emission power of the intensifying screen.

For some purposes, however, the outermost layer of the screen may not be completely transparent but light-diffusing in accordance with the teaching of the published German Patent Application (Dt-OS) No. 2.709.664 filed Mar. 5, 1977 by Agfa-Gevaert AG.

As explained in said published German Patent Application some light-scattering in the outermost layer is advantageous to counteract the input of weak spotwise emitted light into the radiographic recording element that is used in conjunction with the X-ray image intensifying screen.

The weak spotwise emitted light originates from traces of radioactive decay products (radioisotopes) present in the phosphor layer. Radioactive decay products are often associated with phosphors containing rare earth metals e.g. in phosphors such as a lanthanum oxyhalide activated with one or more other rare earth metals.

Whenever the phosphor particles are struck by radioactive radiation of the radioisotopes, fluorescent light is produced, which spotwise exposes the adjacent silver halide emulsion layer used as radiographic element.

On development black spots are obtained, which is particularly disturbing for the image quality.

The formation of black spots intensifies as the time passes. This is clearly demonstrated by an increased number of spots when a silver halide film has remained for several days in a cassette comprising screens that include rare earth metal phosphors with traces of radioactive elements. Most of the fluorescent radiation emitted under the influence of the radioactive disintegration in the interior of the phosphor layer is fortunately strongly scattered in the phosphor screen layer so that its input in an adjacent silver halide emulsion layer is substantially attenuated. Such is, however, not the case with the radioactive radiation and the fluorescent radiation emitted at or close to the surface of the phosphor layer.

The light-scattering character of a light-diffusing protective coating causes the light of the tiny low intensity fluorescent radiation spots produced by the radioactive traces in the phosphor particles close to the phosphor layer surface to be sufficiently dispersed in said light-diffusing layer and to be substantially prevented from spotwise directly exposing the silver halide emulsion layer in contact with the light-emitting side of said screen.

The present invention includes an X-ray image intensifying screen comprising a protective (e.g. a protective outermost) layer which is light-diffusing.

The light-diffusing properties of the protective layer according to the present invention, may be obtained by providing a patterned, irregular or other surface configuration which randomly diffuses light.

Preference is given to a protective light-diffusing layer that does not bring about a reduction of fluorescent light emission by more than 50%, and wherein the light-diffusing layer is of such composition that when compared under identical X-ray exposure conditions with a radiographic combination of silver halide emulsion material and screen without said light-diffusing layer the image resolution in the silver halide emulsion material expressed in terms of modulation transfer at 1 linepair per mm is reduced by not more than 10%.

The light-diffusing protective layer contains according to one embodiment numerous discrete light-scattering volumes of a substance or substances distributed at random in the crosslinked polymer mass or partially embedded therein, such volumes having a mean size not larger than 20 μm. The substance or substances of said volumes preferably have an index of refraction differing by at least 0.1 from the index of refraction of the polymer mass. The index of refraction of light-scattering volumes having a size more than 10 μm differs at least 0.3 from the index of refraction of said polymer mass.

It is possible to use light-scattering volumes having an index of refraction not more than 0.1 different from the index of refraction of the polymer mass but then they should be of colloidal size in the range of 1 μm to $10^{-3}$ μm.

When particles having a size smaller than the wavelength of the fluorescent light are used the intensity of scattered light is proportional to the inverse fourth power of the wavelength. Scattering of this type is called "Rayleigh scattering". In the case of colloidal particles sizing 50 nm, blue light having half of the wavelength of red is scattered sixteen times more.

The light-scattering volumes are preferably solid substances, preference being given to solid substances that are substantially transparent to the light emitted by the phosphor particles of the underlying phosphor layer.

Examples of solid substances for use in the light-diffusing protective coating are listed in the following table 1.

Table 1

| Solid substance | mean particle size (μm) | index of refraction (25° C. at 589 nm) |
|---|---|---|
| 1. $CaWO_4$ | 10-20 | 1.92 |
| 2. $TiO_2$ anatase | 5-10 | 2.55-2.49 |
| $TiO_2$ rutile | 5-10 | 2.61-2.90 |
| 3. $SiO_2$ | 0.01-1 | 1.54 |

The solid substances included in the light-diffusing layer are preferably phosphor particles, e.g. calcium tungstate particles, with the proviso, however, that they are free from radioactive elements.

An advantage of the use of a crosslinked polymer mass for an outermost phosphor-containing protective layer the phosphor of which is different from the phosphor of the underlying phosphor layer, which may be called "main phosphor layer", lies in the possibility to recover the phosphors of these layers without intermixture. Indeed, it is usual practice to recover the phosphors from screen portions that are obtained as scrap in format cutting.

The crosslinked protective layer containing a phosphor different from the phosphor(s) of the main phosphor layer can be peeled off from the main phosphor layer integrally when the screen is subjected to a solvent treatment for dissolving the binder of the main phosphor layer without dissolving the crosslinked binder of the outermost layer that may be penetrated and swollen by said solvent.

It is further advantageous to use an X-ray image intensifying screen which contains in the protective coating solid particulate material protruding from that coating and having a static friction coefficient ($\mu$) at room temperature (20° C.) not higher than 0.50 on steel. Such material is described in the published German Patent Application (Dt-OS) No. 2616093 filed Apr. 13, 1976 by Agfa-Gevaert AG.

Said solid particulate material incorporated in the protective coating of the screen according to the present invention markedly reduces friction which occurs e.g. during the introduction of radiographic film sheets between the screens. The protruding particles offer to the outermost layer micro-unevenesses of e.g. at least 3 μm. Preferably they offer to the surface of the outermost layer micro-unevenesses in the range of 5 to 10 μm.

According to practical embodiments the protruding particles are made of polystyrene, a copolymer of styrene, a solid polyalkylene e.g. polyethylene or an organic fluorinated polymer. An example of a particularly suitable copolymer for forming said protruding particles is a copolymer of styrene and divinylbenzene containing said monomers in a weight ratio of 93:3.

The fluorescent X-ray image intensifying screens according to the invention may contain all kinds of phosphor particles e.g. calcium tungstate or one or more rare-earth metal compounds containing as host metal and/or activator metal at least one element with atomic number 39 or 57 to 71. In this connection are preferred because of their high fluorescent light emission power rare-earth oxysulphide or oxyhalide compounds of lanthanum or gadolinium activated with at least one other rare earth metal e.g. terbium.

The fluorescent X-ray image intensifying screens can emit in a wide spectral range. For example depending upon the particular phosphor or mixture of phosphors employed, they can have, e.g., a substantial part, that is, more than half of their spectral emission, in a wavelength range shorter than about 410 nm. Phosphors suited for that purpose are, e.g. lead barium sulphate, gadolinium-activated yttrium oxide, lanthanide- or lead-activated strontium sulphate or various mixed alkaline earth phosphors such as barium strontium sulphate, and europium-activated barium strontium sulphate. Said phosphors can be prepared by a number of ways such as set forth in Belgian Pat. No. 703,988 filed Sept. 18, 1967 by Badische Anilin and Soda Fabrik AG, by Buchanan et al in J. Appl. Phys. 39 (1968) 4342-4347 and by Clapp and Gunther in J. Opt. Soc. Am. 37 (1947) 355-362.

An ultraviolet-emitting phosphor is barium fluoride chloride activated with europium(II) as described in French patent specification No. 2,185,667 filed May 23, 1973 by Philips' Gloeilampenfabrieken N.V.

By using calcium tungstate the spectral emission is mainly above 410 nm.

Particularly useful screens emitting blue light contain a rare earth metal-activated lanthanum oxyhalide having more than half its spectral emission above 410 nm, more than half its spectral emission of visible light between 400 and 500 nm, and its maximum of emission in the wavelength range of 400-450 nm. Preferred phosphors of that class correspond to one of the following general formulae:

$$La_{(1-n)}Tb_n^{3+}OX$$

wherein

X is halogen such as e.g. chlorine, bromine or fluorine, and n is from 0.006 to 0.0001 the halogen is preferably present in the range of between the stoichiometric amount and about 2.5 percent deviating thereof or $$La_{(1-w-y)}OX:Tb_wYb_y$$

wherein

X is chlorine or bromine w is from 0.0005 to 0.006 per mole of the oxyhalide and y is from 0.00005 to 0.005 per mole of the oxyhalide.

Cerium may replace lanthanum in an amount described in U.K. patent specification No. 1,247,602 filed Oct. 9, 1969 by General Electric & Co.

The preparation of terbium-activated lanthanum oxychloride and lanthanum oxybromide phosphors is described e.g. in U.K. patent specification No. 1,247,602 mentioned before, French patent specification Nos. 2,021,398 and 2,021,399 both filed Oct. 23, 1969 by General Electric & Co., and published German Patent Applications (Dt-OS) Nos. 1,952,812 filed Oct. 21, 1969 and 2,161,958 filed Dec. 14, 1971 both by General Electric & Co. Suitable lanthanum oxychloride-fluoride phosphors are described in the published German patent application (Dt-OS) No. 2,329,396 filed June 8, 1973 by Siemens AG.

The preparation of lanthanum oxyhalides activated with terbium and ytterbium is described, e.g., in published German Patent Application (Dt-OS) No. 2,161,958 mentioned before.

Oxyhalide phosphors of lanthanum activated with thulium and their use in intensifying screens are described in the U.S. Pat. No. 3,795,814 of Jacob G. Rabatin issued Mar. 5, 1974.

Other phosphors that are likewise particularly suited for use in the intensifying screens of the present invention are represented by the following general formula:

$$M_{(w-n)}\cdot M'_nO_wX$$

wherein:

M is at least one of the metals yttrium, gadolinium, and lutetium,

M' is at least one of the rare earth metals dysprosium, erbium, europium, holmium, neodymium, praseodymium, samarium, terbium, thulium and yttrium, X is sulphur or halogen, n is from 0.0002 to 0.2, and w is 1 when X is halogen or is 2 when X is sulphur.

Many of the phosphors represented by this general formula have an emission in the green part of the visible spectrum with emission peaks at about 490 nm and about 540 nm and are prepared as described in French patent specification No. 1,580,544 filed July 25, 1968 by Philips'Gloeilampenfabrieken N.V., U.S. Pat. No. 3,418,246 issued Dec. 24, 1968 by Maden R. Royce and 3,418,247 issued Dec. 24, 1968 by Percy N. Yocom, and U.K. patent specification No. 1,247,602 mentioned hereinbefore.

Another phosphor emitting in a range higher than 500 nm with emission maximum between 530 and 630 nm suited for use in a screen material of the present invention is represented by the following general formula:

$$M_{(2-x)}Tb_2O_2S$$

wherein M is yttrium and x is between 0.002 and 0.2. Phosphors according to this general formula are described, e.g., in U.K. Patent Specification 1,206,198 filed Mar. 28, 1968 by Philips'Gloeilampenfabrieken N.V.

The particle size of the phosphors used in the present invention is preferably between 0.1 μm and about 20 μm more preferably between 1 μm and 12 μm whereby this range embodies about 80% by volume of the phosphor present in the said screen.

Suitable binders for use in the preparation of the phosphor layer covered by the present outermost protective coating are, e.g., a cellulose acetate butyrate, polyalkyl (meth)acrylates, e.g. polymethyl methacrylate, a polyvinyl-n-butyral e.g. as described in the U.S. Pat. No. 3,043,710 of Stanley Hancock Patten and Arnold R. Kennes issued July 10, 1962, a copoly(vinyl acetate/vinyl chloride) and a copoly(acrylonitrile/-butadiene/styrene) or a copoly(vinyl chloride/vinyl acetate/vinyl alcohol) or mixtures thereof.

To provide high X-ray efficiency it is preferable that a minimum amount of binder be employed in the phosphor layer. However, the less binding agent the more brittle the layer, so that a compromise has to be made. The thicker said phosphor layer the higher the intensification of the screen, but the sharpness is decreased accordingly so that a balance between speed and definition is chosen.

The thickness of the supported phosphor layer may vary within a broad range but is preferably in the range of 0.05 to 0.5 mm.

The coverage of the phosphors is e.g. in the range from about 200 to 800 g/sq.m and preferably from about 300 to 700 g/sq.m.

The image sharpness obtainable with a fluorescent screen-silver halide material system can be improved considerably by incorporating a fluorescent light-absorbing dye called here "screening dye" into the fluorescent screen material, e.g. in the phosphor layer or into a layer adjacent thereto e.g. in a subjacent anti-reflection layer. As the oblique radiation covers a large path in the screen material it is attenuated by the screening dye or dyes to a greater extent than the radiation impinging normally. The term "screening dye" includes here dyestuffs (i.e. coloured substances in molecularly divided form) as well as pigments.

Diffuse radiation reflecting from the support of the fluorescent screen material is mainly attenuated in an anti-reflection layer containing the screening dyes subjacent to the fluorescent layer.

The screening dye has not to be removed from the fluorescent screen material and therefore may be any dye or pigment absorbing in the emission spectrum of the fluorescent substance(s). Thus a black substance such as carbon black incorporated in said anti-reflection layer of the screen material yields quite satisfactory results.

The screening dye(s) is (are) preferably used in the phosphor layer e.g. in an amount of at least 0.5 mg per sq.m. Their amount in the anti-reflection layer, however, is not limited.

An appropriate screening dye for use in the fluorescent screens emitting in the green part (500–600 nm) of the visible spectrum is, e.g., Neozapon Fire Red (C.I. Solvent Red 119), an azochromium rhodamine complex. Other suitable screening dyes are C.I. Solvent Red 8, 25, 30, 31, 32, 35, 71, 98, 99, 100, 102, 109, 110, 188, 124 and 130.

The non-self-supporting phosphor-binder composition may be coated on a wide variety of supports e.g. cardboard and plastic film e.g. polyethylene terephthalate film. The supports used in the fluorescent screens of the present invention may be coated with (a) subbing layer(s) for improving the adherence of the phosphor coating thereto.

The screens of the present invention will normally be used in conjunction with light-sensitive silver halide materials emulsion-coated on one or both sides of the support.

In the preparation of a fluorescent X-ray image intensifying screen according to the present invention the protective coating is applied to an already coated dry phosphor layer. The coating composition is prepared by mixing in dissolved state in an organic liquid medium the crosslinkable reactive hydrogen-containing polymer(s) with the above described crosslinking agent containing a plurality of etherified N-methylol groups or mixture of such agents. An acid acting as crosslinking catalyst is homogeneously mixed with the above ingredients preferably just prior to coating in order to avoid premature crosslinking and insolubilization of the polymer(s). The coating of the protective layer to an already existing phosphor binder layer may proceed by a usual coating technique, e.g. by spraying or dip-coating. After coating, the solvent of the coating mixture is removed by evaporation, e.g. by drying in an air stream of 60° C. during 15 min, and the crosslinking is accelerated by heating the coated composition within a temperature range of preferably 80° to 110° C.

The heating resulting in a thorough curing lasts preferably at least 10 min at 110° C. and proceeds, e.g., in a heating tunnel operating with hot air. Other heating sources, e.g. infrared rays and hot bodies, e.g. metal rollers contacting the support side of the screen may be used likewise.

According to a modified embodiment the acid catalyst is applied to the coating mixture after coating e.g. to the already semi-dry protective coating so that the curing proceeds substantially at the outer face of the protective coating.

It is likewise possible to apply the catalyst in the underlying phosphor layer containing a non-crosslinkable polymer binder medium from which the catalyst can diffuse by solvent and/or evaporation into the covering protective coating.

The following example illustrates the present invention without, however, limiting it thereto. All parts, percentages and ratios are by weight unless otherwise stated.

EXAMPLE

Preparation of Screen A

Into a porcelain ball-mill of 1 liter were placed: 100 g of terbium-activated lanthanum oxybromide phosphor, 2 g of polyethylmethacrylate, a mixture of solvents consisting of 22 g of butanone, 8.8 g of ethylene glycolmonomethyl ether and 1.6 g of ethyl acetate, and 0.5 g of GAFAC RM-710 as dispersing aid. GAFAC is a trade name of Gen. Aniline U.S.A. (see Chem. & Eng. News 40 (1962) no. 16, p. 87). GAFAC RM-710 is a mixture of

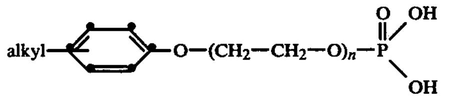

and

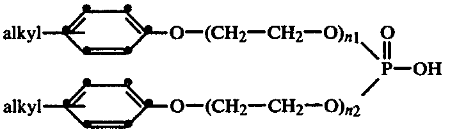

alkyl = C15 to 20
n = 15 to 20
$n_1 + n_2$ = 15 to 20

The mixture was ball-milled to a fineness of grind corresponding with 7 NS Hegman Fineness-of-Grind measured with the Hegman gage as specified in ASTM D1210. Thereupon 5.5 g of polyethyl methacrylate, 5 g of polyethyl acrylate and 2.5 g of di-octylphthalate as plasticizer were added and the dispersion diluted with the above combination of solvents in a ratio corresponding with the above amounts to a solids content of 72%. Ball-milling was continued for an additional 15 min. The dispersion was filtered and after de-aeration coated on a subbed polyethylene terephthalate support having a thickness of 0.2 mm.

The coating was effected at a phosphor coverage of 500 g per sq.m.

For the preparation of the protective layer (1) polyvinyl butyral having a molecular weight in the range of 45,000 to 55,000 and a vinyl alcohol unit content of 13% and (2) CYMEL 300 (trade name) were dissolved up to a solids content of 15% in a ratio of (1) to (2) of 85:15 in an organic solvent mixture of 50 parts of ethylene glycolmonomethylether, 25 parts of isopropanol and 25 parts of ethanol. Thereupon 2% of p-toluene sulphonic acid calculated on the polyvinyl butyral were added and thoroughly mixed with the obtained solution.

The solution was de-aerated and applied by dip-coating to the already formed phosphor-binder layer. The drying of the layer proceeded for 15 min in an air stream of 60° C. and curing was effected for 10 min at 110° C. The dried and cured protective layer had a thickness of 12 μm.

Preparation of Screen B

The preparation of screen B proceeded in the same way as the preparation of screen A with the difference, however, that the coating of the protective layer proceeded starting from a 15% solution of cellulose acetobutyrate in ethylene glycolmonomethylether. The cellulose acetobutyrate had a degree of acetate substitution of 1.31 and a degree of butyrate substitution of 1.59. The coating was effected in such a way that the dried coating had a thickness of 12 μm.

Both screens A and B were contacted for 30 min with water damp of 100° C.

The use of the screens in X-ray exposure with a conventional black-and-white silver halide film such as CURIX RP1 (CURIX is a trade name of AGFA-GEVAERT N.V. Belgium) revealed in the area of the film exposed with screen B the presence of zones of substantially lower density as compared with other zones whereas in the area of the film exposed with screen A no inhomogeneities in density were observed. The said zones of reduced density correspond to zones in the screen B where the phosphor has lost fluorescence power by the water damp treatment.

We claim:

1. X-ray image intensifying screen including at least one fluorescent layer comprising phosphor particles dispersed in a binder and on top of such layer a protective layer containing a crosslinked polymer mass obtained by an acid-catalyzed reaction of a polymer or mixture of polymers containing reactive hydrogen atoms and a crosslinking agent, the crosslinking agent being an organic compound containing a plurality of etherified N-methylol groups.

2. A screen according to claim 1, wherein the polymer or mixture of polymers contains reactive hydrogen atoms forming part of one or more groups of the class consisting of free hydroxyl groups,

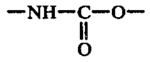 groups and —COOH groups.

3. A screen according to claim 1, wherein the etherified N-methylol groups are $-\overset{|}{N}-CH_2OCH_3$ groups.

4. A screen according to any of the preceding claims, wherein the polymer is a polyester comprising free hydroxyl groups, a polyvinyl acetal in which part of the hydroxyl groups of the polyvinyl alcohol starting product has not been acetalized, a copolymer of vinyl alcohol and vinyl chloride or a copolymer of vinyl chloride, vinyl acetate and vinyl alcohol.

5. A screen according to claim 4, wherein the polymer is polyvinyl butyral with from 80 to 90% by weight of vinyl butyral units, 7 to 20% by weight of vinyl alcohol units and 0 to 3% by weight of vinyl ester units.

6. A screen according to claim 5, wherein the polyvinyl butyral has a molecular weight in the range of 45,000 to 55,000.

7. A screen according to claim 1, wherein the crosslinking agent is hexakis(methoxymethyl)-melamine.

8. A screen according to claim 1, wherein in the acid-catalyzed reaction p-toluene sulphonic acid has been used.

9. A screen according to claim 1, wherein the crosslinking agent has been used in an amount in the range of 5 to 20% by weight with respect to the crosslinkable polymer(s).

10. A screen according to claim 1, wherein the protective coating has in dry state a thickness in the range of 2 $\mu m$ to 20 $\mu m$.

11. A screen according to claim 1, wherein the protective layer is light-diffusing, but does not bring about a reduction of fluorescent light emission by more than 50%, and wherein the light-diffusing layer is of such composition that when compared under identical X-ray exposure conditions with a radiographic combination of silver halide emulsion material and screen without said light-diffusing layer the image resolution in the silver halide emulsion material expressed in terms of modulation transfer at 1 line pair per mm is reduced by not more than 10%.

12. A screen according to claim 1, wherein the phosphor particles of the fluorescent layer include one or more rare-earth metal compounds containing as host metal and/or activator metal at least one element with atomic number 39 or 57 or 71.

13. A screen according to claim 12, wherein said phosphor particles are rare-earth oxysulfide or oxyhalide compounds of lanthanum or gadolinium activated with at least one other rare-earth metal.

* * * * *